United States Patent
Sueki et al.

(10) Patent No.: US 6,228,461 B1
(45) Date of Patent: May 8, 2001

(54) MAGNETIC RECORDING TAPE

(75) Inventors: Minoru Sueki; Masatoshi Takahashi; Yutaka Kakuishi, all of Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/259,290

(22) Filed: Mar. 1, 1999

(30) Foreign Application Priority Data

Feb. 27, 1998 (JP) .................................................. 10-064294

(51) Int. Cl.$^7$ .................................................... G11B 5/735
(52) U.S. Cl. .............................. 428/98; 428/216; 428/220; 428/323; 428/336; 428/694 BS; 428/694 BB; 428/694 SL; 428/480; 428/900; 360/134
(58) Field of Search ............................... 428/98, 323, 336, 428/220, 694 BS, 694 BB, 694 SL, 216, 480, 900; 360/134

(56) References Cited

U.S. PATENT DOCUMENTS 5,904,979 * 5/1999 Kakuishi et al. ..................... 428/328

5,958,565 * 9/1999 Hattori et al. ....................... 428/212

FOREIGN PATENT DOCUMENTS 62-082511 * 10/1985 (JP) .

* cited by examiner

Primary Examiner—Stevan A. Resan
(74) Attorney, Agent, or Firm—Sughrue, Mion, Zinn, Macpeak & Seas, PLLC

(57) ABSTRACT

A magnetic recording tape favorably employable for recording computer data is composed of a support, and on one side of the support, a non-magnetic layer composed of a non-magnetic powder and a binder, and a magnetic recording layer composed of a ferromagnetic powder and a binder superposed in order, and on the other side, a back-coating layer containing carbon black, in which the magnetic recording tape has a lateral thermal expansion coefficient of not more than 0.0015%/° C., a lateral humidity expansion coefficient of not more than 0.0015%/% RH, a longitudinal offset proof stress of not less than 10 N, and a longitudinal breaking strength of not less than 30 N.

23 Claims, No Drawings

MAGNETIC RECORDING TAPE

FIELD OF THE INVENTION

This invention relates to a magnetic recording tape advantageously used for recording computer data. In particular, the invention relates to a magnetic recording tape advantageously employable in a magnetic recording-reproducing system equipped with a magnetoresistive reproducing head (MR head).

BACKGROUND OF THE INVENTION

Recently, in magnetic recording-reproducing systems for computer data, thin-film magnetic heads have been practically used. Since the thin-film magnetic heads can be easily downsized and applied to multi-track heads, they are widely used for multi-track linear recording systems, particularly, employing magnetic recording tapes as recording media. The downsized head elevates the track density to improve the recording efficiency, and consequently enables the recording tape to record the data in a high density. Further, in a multi-tracking system, it can increase the data transfer rate.

The thin-film magnetic heads are roughly categorized into two types, namely, magnetic inductive head (which responds to time-dependent variation of magnetic flux) and magnetoresistive head (which responds to scale of magnetic flux). Since the inductive head generally has a flat structure, its head coil consists of a relatively small number of turns. Accordingly, the inductive head cannot give magnetism large enough to obtain satisfying reproduction output. For this reason, the magneto-resistive head (MR head) giving enough output power, is used for reproduction, while the inductive head is used as a recording head. Those magnetic heads are generally incorporated in a unified system adopting the linear recording method for rapid data transfer.

The magnetic recording tape used in the system equipped with an MR head is determined depending on the recording and reproducing system. For example, magnetic recording tapes applied to IBM systems of 3480, 3490, 3590 and 3570 are known and commercially available. Each of those tapes has a basic structure in which a single thick magnetic layer (thickness: approx. 2.0 to 3.0 $\mu$m) containing a ferromagnetic powder and a binder is provided on a flexible support. In general, in order to ensure good running durability and to inhibit wrong winding, the tape for recording computer date further comprises a back-coating layer provided on the reverse side (i.e., side on which the magnetic recording layer is not provided) of the support.

It is a problem that the magnetic recording tape having the single thick magnetic layer can not always store a great deal of date. Therefore, a magnetic recording tape having double layers has been proposed [Japanese patent provisional Publication No. 8(1996)-227517, which corresponds to Y. Kakuishi et al., U.S. Pat. application Ser. No. 08/602,567, filed Feb. 14, 1996]. In the proposed magnetic recording tape, a lower non-magnetic layer comprising a non-magnetic inorganic powder dispersed in a binder and an upper magnetic recording layer comprising a ferromagnetic powder dispersed in a binder are superposed and provided on a non-magnetic support. The upper magnetic layer can be made thin, and thereby output depression caused by thickness loss can be avoided. Further, the magnetic recording tape having double layers can store the computer data much more than a magnetic recording tape having a single thick layer because the data recording density can be increased. As an example, the aforementioned publication discloses a magnetic recording tape comprising a support made of polyethylene terephthalate (thickness: 10 $\mu$m), and on one side of the support, a non-magnetic layer (thickness: 2.7 $\mu$m) and a magnetic recording layer (thickness: 0.3 $\mu$m) superposed in order.

For accomplishing both of high recording density and large recording capacity, a narrow magnetic recording tape is often used in the system adopting the linear recording method. In the system, it is necessary to precisely control the position of the magnetic head because the head is moved laterally (i.e., wide direction which is perpendicular to the longitudinal direction of the recording tape) to select the track for recording or reproducing.

In a conventional system of linear recording method, the magnetic recording tape runs through a predetermined path guided by the support members (e.g., guide poles) and the magnetic head is laterally moved between the predetermined positions on the tape. If the narrow recording tape expands or shrinks with heat or moisture or if the recording tape runs with drift, the reproducing head can hardly trace the proper position of the track and consequently gives poor output. For avoiding this trouble, a magnetic recording tape on which servo signals are longitudinally recorded has been recently proposed. The servo signals precisely give the width position of the head on the recording tape, so that the head can be controlled to place at the proper position of the track. The servo signals consist of plural servo bands each of which comprises signals varying in the width direction, and hence the position of the head can be precisely detected by reproducing the signals. In that system, the width of the servo band and the lateral interval between the servo bands are preferred not to vary with heat, moisture, tape running and so on. Therefore, the magnetic recording tape bearing the servo signals is preferred to keep the constant lateral dimension even if the environmental conditions (e.g., temperature, humidity) vary.

Further, the magnetic recording tape used in the above-mentioned system is also desired to keep the constant longitudinal dimension while it repeatedly runs with a high speed. In the system equipped with an MR head (which can densely record the data), the recording tape is tightly stretched so as to ensure good contact between the recording tape and the head. Particularly at a moment to stop or start the recording tape, high tension is given to both ends of the tape [BOT: beginning (starting end) of the tape and the EOT: end (terminal end) of tape]. Consequently, the tension often longitudinally enlarges the tape to lower the output, and at the same time, to change the lateral dimension in the width direction. In that case, the servo signals recorded on the tape cannot precisely indicate the position of the head, and hence troubles are liable to occur. For this reason, the magnetic recording tape used in the above-identified system is desired to have improved mechanical strength also in the longitudinal direction.

According to the study of the inventors, the magnetic recording tape described in the aforementioned Japanese patent provisional Publication No. 8(1996)-227517 ought to be improved in the tracking and running characteristics for using for the system with an MR head. The magnetic recording tape considerably expands or shrinks with heat or moisture in the lateral direction, and hence the tracking accuracy often reduces to give poor output even if the tracking control based on the servo signals is conducted. Further, the magnetic recording tape having repeatedly run often causes troubles with the system.

It is an object of the present invention to provide a magnetic recording tape favorably employable for a magnetic recording-reproducing system employing a magnetoresistive head in the linear recording method. In more detail, the magnetic recording tape to be provided by the invention keeps the constant lateral dimension so that the magnetic head can trace the proper position of the track even if the recording tape has a narrow width.

SUMMARY OF THE INVENTION

The inventors have studied about the magnetic recording tapes, and found that the lateral dimensional variation in the width direction can be reduced by lowering the thermal and humidity expansion coefficients and by increasing the longitudinal mechanical strength. In the system employing the magnetic recording head seldom traces the wrong position (off-track) and the preferable tracking characteristics can be ensured. Practically, the magnetic recording tape suitable for the system equipped with an MR head can be obtained by employing a support having a proper mechanical strength in its longitudinal and/or the lateral direction because the dimensional variation mainly depends on the support material.

The present invention resides in a magnetic recording tape comprising a support, and on one side of the support, a non-magnetic layer comprising a non-magnetic powder and a binder, and a magnetic recording layer comprising a ferromagnetic powder and a binder superposed in order, and on the other side, a back-coating layer containing carbon black, wherein the magnetic recording tape has a lateral thermal expansion coefficient of not more than 0.0015/° C., a lateral humidity expansion coefficient of not more than 0.0015%/%RH, a longitudinal offset proof stress of not less than 10 N, and a longitudinal breaking strength of not less than 30 N.

The preferred embodiments of the invention are as follows.

(1) The lateral thermal expansion coefficient is not more than 0.0010%/° C., and more preferably not more than 0.0008%/° C.

(2) The lateral humidity expansion coefficient is not more than 0.0013%/%RH, and more preferably not more than 0.0010%/%RH.

(3) The longitudinal offset proof stress is not less than 11 N, and more preferably in the range of 15 to 20 N.

(4) The longitudinal breaking strength is in the range of 31 to 35 N.

(5) The support has a lateral Young's modulus of not less than 600 kg/mm$^2$, more preferably not less than 630 kg/mm$^2$, and most preferably in the range of 650 to 700 kg/mm$^2$.

(6) The support has a longitudinal Young's modulus of not less than 750 kg/mm$^2$, and more preferably in the range of 800 to 850 kg/mm$^2$.

(7) The support is made of polyethylene naphthalate.

(8) The magnetic recording tape has a lateral Young's modulus of not less than 650 kg/mm$^2$, more preferably not less than 700 kg/mm$^2$, and most preferably in the range of 730 to 800 kg/mm$^2$.

(9) The magnetic recording tape has a longitudinal Young's modulus of not less than 950 kg/mm$^2$, more preferably not less than 980 kg/mm$^2$, and most preferably in the range of 1000 to 1100 kg/mm$^2$.

(10) The magnetic recording tape has a width of 5 to 13 mm, more preferably 7 to 13 mm, and most preferably 10 to 13 mm.

(11) The magnetic recording tape has a total thickness of 5 to 10 μm, more preferably 7 to 9.5 μm, and most preferably 7.5 to 9.5 μm.

(12) The carbon black comprises a combination of two kinds of carbon blacks having different mean particle sizes. One carbon black consists of relatively fine particles having a mean particle size of 10 to 30 mμ, and the other consists of relatively crude particles having a mean particle size of 150 to 300 mμ.

(13) The back-coating layer further contains an inorganic material powder having Mohs' scale of hardness of 5 to 9.

(14) The inorganic material powder of the above (13) has a mean particle size of 0.08 to 1 μm, more preferably 0.05 to 0.5 μm, and most preferably 0.08 to 0.3 mμ).

(15) The inorganic material powder of the above (13) is α-alumina.

(16) The back-coating layer has a thickness of 0.2 to 0.8 μm.

(17) Servo signals for controlling a recording or reproducing head are longitudinally recorded on the magnetic recording tape so as to place the head at a proper lateral position (or the width or traverse position) on the recording tape.

(18) The magnetic recording tape is used in a magnetic recording-reproducing system employing a magneto-resistive reproducing head.

(19) The magnetic recording tape is designed for multi-tracks linear recording systems.

DETAILED DESCRIPTION OF THE INVENTION

The magnetic recording tape of the invention comprises a support, and on one side of the support, an essentially non-magnetic layer comprising a non-magnetic powder and a binder, and a magnetic layer comprising a ferromagnetic powder and a binder superposed in order, and on the other side, a back-coating layer containing carbon black. The magnetic recording tape of the invention is characterized by having a lateral thermal expansion coefficient of not more than 0.0015%/° C., a lateral humidity expansion coefficient of not more than 0.0015 %/%RH, a longitudinal offset proof stress of not less than 10 N, and a longitudinal breaking strength of not less than 30 N.

Preferred values of the lateral thermal expansion coefficient, the lateral humidity expansion coefficient, the longitudinal offset proof stress and the longitudinal breaking strength are not more than 0.0010%/° C., and more preferably not more than 0.0008%/° C., not more than 0.0013%/%RH, and more preferably not more than 0.0010%/%RH, not less than 11 N, and more preferably 15 to 20 N, and in the range of 31 to 35 N, respectively.

A method for preparing the magnetic recording tape having the above-mentioned characteristics is not particularly restricted, but it is preferred to use a support material having proper mechanical strength in the longitudinal and/or lateral direction. For example, since a polymer resin is preferably used as the support material, the resin is longitudinally and/or laterally stretched to form a film for the support having the desired mechanical strength. Preferably, the support has a lateral Young's modulus of not less than 600 kg/mm$^2$, more preferably not less than 630 kg/mm$^2$, and most preferably in the range of 650 to 700 kg/mm$^2$, and a longitudinal Young's modulus of not less than 750 kg/mm$^2$, and more preferably in the range of 800 to 850 kg/mm$^2$.

As the material for the support of the invention, synthetic polymer resins are preferably employed and materials used for those of the conventional magnetic recording tapes are employable. Particularly, non-magnetic materials are preferred. Examples of the materials include polyesters (e.g., polyethylene terephthalate, polyethylene naphthalate, a mixture of polyethylene terephthalate and polyethylene naphthalate, copolymer comprising both ethylene terephthalate component and ethylene naphthalate), polyolefins (e.g., polypropylene), cellulose derivatives (e.g., cellulose diacetate, cellulose triacetate), polycarbonate, polyamides (e.g., aromatic polyamide, aramid), and polyimides (e.g., aromatic polyimide). Preferred is polyethylene naphthalate (PEN). The thickness of the support is not specifically restricted, but preferably in the range of 2.0 to 7.5 μm, more preferably 3.0 to 7.0 μm, and most preferably 4.5 to 6.5 μm.

The magnetic recording tape of the invention preferably has a lateral Young's modulus of not less than 650 kg/mm$^2$, more preferably not less than 700 kg/mm$^2$, and most preferably 730 to 800 kg/mm$^2$, and a longitudinal Young's modulus of not less than 950 kg/mm$^2$, more preferably not less than 980 kg/mm$^2$, and most preferably 1000 to 1100 kg/mm$^2$.

Each component (other than the support described above) of the magnetic recording tape of the invention is explained below in order.

First, the magnetic recording layer is described in more detail.

The magnetic recording layer contains a ferromagnetic powder and a binder, and may further contain a lubricant, an electroconductive powder (e.g., carbon black) and an abrasive.

Examples of the ferromagnetic powder include ferromagnetic iron oxide FeO$_x$ (x=1.33 to 1.5), FeO$_x$ modified with Co (x=1.33 to 1.5), ferromagnetic alloy (metal) powder mainly comprising Fe, Ni or Co (in an amount of not less than 75%), and tabular hexagonal ferrite powder. Particularly preferred is ferromagnetic alloy powder.

The ferromagnetic powder may further include at least one element selected from the group consisting of Al, Si, S, Sc, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr and B.

The ferromagnetic powder may be treated with various agents (e.g., dispersants, lubricants, surface active agents, antistatic agents) before it is dispersed in a binder. The treatments can be carried out in the manners described in, for example, Japanese Patent Publications No. 44(1969)-14090, No. 45(1970)-18372, No. 47(1972)-22062, No. 47(1972)-22513, No. 46(1971)-28466, No. 46(1971)-38755, No. 47(1972)-4286, No. 47(1972)-12422, No. 47(1972)-17284, No. 47(1972)-18509, No. 47(1972)-18573, No. 39(1964)-10307 and No. 48(1973)-39639, and U.S. Pat. Nos. 3,026, 215, 3,031,341, 3,100,194, 3,242,005 and 3,389,014. Further, the ferromagnetic alloy powder may include hydroxides or oxides in a very small amount.

The ferromagnetic alloy powder preferably has a specific surface area of 30 to 70 m$^2$/g, and a crystallite size of 50 to 300 angstroms (which is determined by X-ray diffraction method). If the specific surface area is too small, the resulting magnetic recording tape can not densely record the data. On the other hand, since the ferromagnetic alloy powder having a too large specific surface area is not dispersed well in the magnetic recording layer, the recording layer containing such powder does not have a surface smooth enough to record the data in a high density.

The ferromagnetic alloy powder comprises Fe. The powder mainly comprises Fe—Co, Fe—Ni, Fe—Zn—Ni or Fe—Ni—Co, or may comprise Fe alone. In order to ensure high density recording, the ferromagnetic alloy powder preferably has a saturation magnetization (saturation magnetic flux density: σs) of not less than 110 emu/g, and more preferably 120 to 170 emu/g, and a coercive force (Hc) of 1500 to 2500 Oe, more preferably 1700 to 2200 Oe, and most preferably 1800 to 2100 Oe. The alloy powder preferably has a major axis length (i.e., mean particle size) of not more than 0.5 μm, and more preferably 0.01 to 0.3 μm, and an axis ratio (ratio of major axis length/minor axis length; i.e., aspect ratio) of 5 to 20 and preferably 5 to 15 [the values of the particle size and the aspect ratio can be measured by means of a transmission electron microscope]. In order to improve the characteristics, the ferromagnetic alloy powder can contain various additives such as semimetal or nonmetal elements (e.g., B, C, Al, Si, P) and their salts or oxides. Generally, the surface of the alloy powder particles is coated with an oxide layer for chemical stabilization.

The tabular hexagonal ferrite employable as the ferromagnetic powder is a tabular ferromagnetic material having an easy axis of magnetization perpendicular to the tabular plane. Examples of the ferrites include barium ferrite (magnetoplumbite, or magnetoplumbite partially including spinel phase), strontium ferrite (magnetoplumbite, or magnetoplumbite partially including spinel phase), lead ferrite, calcium ferrite, and their cobaltsubstituted ferrites. Preferred are barium ferrite substituted with cobalt and strontium ferrite substituted with cobalt. The ferrite may optionally contain Co—Ti, Co—Ti—Zr, Co—Ti—Zn, Ni—Ti—Zn or Ir—Zn so as to adjust the magnetic resistance.

The average particle size of the tabular ferrite powder indicates an average width of the tabular hexagonal particles (which can be measured by means of an electron microscope), and preferably is in the range of 0.001 to 1.0 μm. The tabular ratio (particle width/particle thickness) and the specific surface area preferably are in the ranges of 2 to 20 and 1 to 60 m$^2$/g, respectively. For the same reason as the ferromagnetic alloy powder described above, the tabular ferrite powder ought to have a moderate particle size so as to densely record the data. In order to ensure high density recording, the ferrite powder preferably has a saturation magnetization (saturation magnetic flux density: σs) of not less than 50 emu/g and more preferably not less than 53 emu/g, and a coercive force (Hc) of 1500 to 2500 Oe, more preferably 1700 to 2200 Oe, and most preferably 1800 to 2100 Oe.

The ferromagnetic powder preferably contains water of a content of 0.01 to 2 wt. %, and the water content is preferably adjusted in consideration of the binder (resin). Further, the pH value is also preferably adjusted in consideration of to the binder (resin), and is usually in the range of 4 to 12 (preferably 5 to 10). A part or whole of the surface of the powder may be optionally covered with oxides of Al, Si, P or Y, and the covering is employed in an amount of 0.1 to 10 wt. % (in terms of an amount of metal such as Al, Si, P or Y) based on the amount of the powder. The ferromagnetic powder having been subjected to the surface treatment adsorbs a lubricant (such as a fatty acid) in an amount of not more than 100 mg/m$^2$, and hence the amount of the used lubricant can be reduced. The ferromagnetic powder sometimes contains water-soluble inorganic ions (e.g., ions of Na, Ca, Fe, Ni and Sr), which generally are not preferred for the powder. However, even in such case, if the content is not more than 5000 ppm, the ions do not disturb the characteristics of the ferromagnetic powder in practice. The ferromagnetic powders and their preparation methods are described in, for example, U.S. Pat. No. 5,534,361.

The carbon black can be generally incorporated into the magnetic recording layer so as to ensure a low surface electric resistance (Rs), a small kinetic friction coefficient ($\mu_k$ value), good running endurance, and smooth surface. The carbon black preferably has a mean particle size (i.e., diameter) of 5 to 350 m$\mu$, and more preferably 10 to 300 m$\mu$, and a specific surface area of 5 to 500 m$^2$/g, and more preferably 50 to 300 m$^2$/g. Further, the carbon black preferably shows a DBP (dibutyl phthalate) oil absorption in the range of 10 to 1000 mL/100 g, and more preferably 50 to 300 mL/100 g, pH of 2 to 10, a water content of 0.1 to 10%, and a tap density of 0.1 to 1 g/cc.

The carbon black can be commercially available carbon black produced by various processes. For instance, furnace black, thermal black, acetylene black, channel black, and lamp black can be employed. Examples of commercially available carbon black include BLACKPEARLS 2000, 1300, 1000, 900, 800, 700, and VULCAN XC-72 [trade names, available from Cabot Corp.]; #35, #50, #55, #60 and #80 [trade names, available from Asahi Chemical Industry Co., Ltd.]; #3950B, #3750B, #3250B, #2400B, #2300B, #1000, #900, #40, #30 and #10B [trade names, available from Mitsubishi Chemicals Co., Ltd.]; CONDUCTEX SC, RAVEN, 150, 50, 40 and 15 [trade names, available from Columbia Carbon Corp.]; and KETCHEN BLACK EC, KETCHEN BLACK ECDJ-500 and KETCHEN BLACK ECDJ-600 [trade names, available from LION AKUZO Co., Ltd.]. The carbon black can be generally incorporated in an amount of 0.1 to 30 weight parts, and preferably 0.2 to 15 weight parts, based on 100 weight parts of the ferromagnetic powder.

Examples of the abrasives include melted alumina, α-alumina, silicon carbide, chromium oxide ($Cr_2O_3$), corundum, artificial corundum, diamond including natural and artificial diamond, garnet, and emery (main components: corundum and magnetite). The abrasive generally has a Mohs' scale of hardness of not less than 5, preferably not less than 6, and more preferably not less than 8, and preferably has a mean particle size (i.e., diameter) of 0.05 to 1 $\mu$m, and more preferably 0.2 to 0.8 $\mu$m. The abrasive can be generally incorporated in an amount of 3 to 25 weight parts, and more preferably 3 to 20 weight parts, based on 100 weight parts of the ferromagnetic powder.

The lubricant can be incorporated into the magnetic recording layer. The incorporated lubricant comes out onto the surface of the layer, and reduces a friction to maintain smooth contact between the magnetic recording layer surface and the magnetic head. As the lubricants, for example, fatty acids and fatty acid esters are employed. Examples of the fatty acids include acetic acid, propionic acid, 2-ethylhexanic acid, lauric acid, myristic acid, palmitic acid, stearic acid, behenic acid, arachic acid, oleic acid, elaidic acid, linolic acid, linolenic acid, palmitoleic acid and their mixtures Examples of the fatty acid esters include butyl stearate, sec-butyl stearate, isopropyl stearate, butyl oleate, amyl stearate, 3-methylbutyl stearate, 2-ethylhexyl stearate, 2-hexyldecyl stearate, butyl palmitate, 2-ethylhexyl myristate, a mixture of butyl stearate and butyl palmitate, oleyl oleate, butoxyethyl stearate, 2-butoxy-1-propyl stearate, dipropyleneglycol monobutyl ether acylated with stearic acid, diethyleneglycol dipalmitate, diol derived from hexamethylnediol by acylating with myristic acid, and glycerin oleate. The fatty acids and fatty acid esters may be employed singly or in combination. The lubricant can be generally incorporated into the magnetic recording layer in an amount of 0.2 to 20 weight parts, and preferably 0.5 to 10 weight parts, based on 100 weight parts of the ferromagnetic powder.

The binder employed for the magnetic recording layer is, for example, thermoplastic resin, thermosetting resin, reactive resin or their mixtures. Examples of the thermoplastic resin include homopolymers or copolymers of vinyl chloride, vinyl acetate, vinyl alcohol, maleic acid, acrylic acid, acrylic ester, vinylidene chloride, acrylonitrile, methacrylic acid, methacrylic ester, styrene, butadiene, ethylene, vinylbutyral, vinylacetal, and vinyl ether. Examples of the preferred copolymers include vinyl chloride-vinyl acetate copolymer, vinyl chloride-vinylidene chloride copolymer, vinyl chloride-acrylonitrile copolymer, acrylic ester-acrylonitrile copolymer, acrylic ester-vinylidene chloride copolymer, acrylic ester-styrene copolymer, methacrylic ester-acrylonitrile copolymer, methacrylic ester-vinylidene chloride copolymer, methacrylic ester-styrene copolymer, vinylidene chloride-acrylonitrile copolymer, butadiene-acrylonitrile copolymer, styrene-butadiene copolymer, and chlorovinyl ether-acrylic ester copolymer.

The examples of the thermoplastic resins further include polyamide resin, cellulosic resins (e.g., cellulose acetate butyrate, cellulose diacetate, cellulose propionate, and nitrocellulose), polyvinyl fluoride, polyester or polyurethane and various elastomer resins.

Examples of the thermosetting resin and the reactive resin include phenol resin, epoxy resin, polyurethane setting resin, urea resin, melamine resin, alkyd resin, acrylic reactive resin, formaldehyde resin, silicone resin, epoxy-polyamide resin, a mixture of polyester resin and polyisocyanate prepolymer, a mixture of polyester polyol and polyisocyanate, and a mixture of polyurethane and polyisocyanate.

Examples of the polyisocyanates include tolylene diisocyanate, 4,4'-diphenylmethane diisocyanate, hexamethylene diisocyanate, xylylene diisocyanate, naphthylene-1,5-diisocyanate, o-toluidine diisocyanate, isophorone diisocyanate, triphenylmethane triisocyanate, products derived from the isocyanates and polyalcohol, and polyisocyanate prepared by condensation reaction of the isocyanates.

Examples of the polyurethanes include polyester-polyurethane, polyether-polyurethane, polycarbonate-polyurethane, polyester-polycarbonate-polyurethane, and polycaprolactone-polyurethane.

Preferably, the binder in the magnetic recording layer comprises a combination of polyurethane resin and at least one resin selected from the group consisting of vinyl chloride resin, vinyl chloride-vinyl acetate copolymer, vinyl chloride-vinyl acetate-vinyl alcohol copolymer, vinyl chloride-vinyl acetate-maleic anhydride and nitrocellulose. Besides them, the binder may further contain hardening agents such as polyisocyanates.

Preferably, the binder resin has at least one polar group selected from the group consisting of —COOM, —SO$_3$M, —OSO$_3$M, —P=O(OM)$_2$, —O—P=O(OM)$_2$ (in which M represents a hydrogen atom or an alkaline metal ion), —OH, —NR$_2$, —N$^+$R$_3$ (in which R represents a hydrocarbon group), epoxy group, —SH and —CN. These polar groups can be incorporated into the binder resin by copolymerization or addition reacion. The resin having the polar group is favorably employed for dispersing the ferromagnetic powder uniformly, and improves durability of the magnetic recording layer. The amount of the polar group preferably is in the range of $10^{-1}$ to $10^{-8}$ mol/g, and more preferably $10^{-2}$ to $10^{-6}$ mol/g.

In the magnetic recording layer, the binder is contained in an amount of 5 to 50 weight parts, and preferably 10 to 30 weight parts, based on 100 weight parts of the ferromagnetic powder. In the case where the magnetic recording layer contains, as the binder, a combination of one or more of the above vinyl chloride resins, polyurethane resin and polyisocyanate, the amounts preferably are in the ranges of 5 to 70 wt. %, 2 to 50 wt. % and 2 to 50 wt. %, respectively.

The coating dispersion for the magnetic recording layer can include a dispersing agent so as to disperse both the ferromagnetic powder and carbon black uniformly in the recording layer. Further, other additives such as plasticizer, antistatic agent (electroconductive fine particles other than carbon black) and antiseptics may be optionally incorporated. Examples of the dispersing agents include a fatty acid having 12–18 carbon atoms (represented by R-COOH in which R is an alkyl group or alkenyl group of 11–17 carbon atoms) such as caprylic acid, capric acid, lauric acid, myristic acid, palmitic acid, stearic acid, behenic acid, oleic acid, elaidic acid, linoleic acid, linolenic acid and stearolic acid; metallic soap derived from the above fatty acid and alkaline metal or alkaline earth metal; a fluorine-containing ester of the above fatty acid; amide of the above fatty acid; polyalkylene oxide alkyl phosphate; lecithin; trialkyl polyolefinoxy quaternary ammonium salt (in which the alkyl group has 1–5 carbon atoms, and the olefin is, for example, ethylene or propylene); sulfates; and copper phthalocyanine. Those compounds may be employed singly or in combination. The dispersing agent can be added in an amount of 0.5 to 20 weight parts based on 100 weight parts of the binder.

Next, the non-magnetic layer is described in more detail.

The non-magnetic layer comprises a non-magnetic powder and a binder, and is essentially non-magnetic. The non-magnetic layer ought to be non-magnetic in order not to decrease the electromagnetic characteristics of the magnetic layer provided thereon. However, if it does not give any adverse effect, the non-magnetic layer may contain a small amount of a magnetic powder. In general, the non-magnetic layer further contains a lubricant.

The non-magnetic powder incorporated in the non-magnetic layer is, for example, a non-magnetic inorganic powder or carbon black. The non-magnetic powder preferably has Mohs' scale of hardness of 5 or more (more preferably 6 or more), and can be α-alumina, β-alumina, γ-alumina, silicon carbide, chromium oxide, cerium oxide, α-iron oxide, corundum, silicon nitride, titanium carbide, titanium dioxide, silicon dioxide, boron nitride, zinc oxide, calcium carbonate, calcium sulfate, or barium sulfate. These non-magnetic powders can be used singly or in combination. Preferred are titanium dioxide, α-alumina, α-iron oxide, and chromium oxide. The non-magnetic inorganic powder preferably has a mean particle size of 0.01 to 1.0 μm, more preferably 0.01 to 0.5 μm, and most preferably 0.02 to 0.1 μm.

The carbon black imparts to the non-magnetic layer an appropriate electroconductivity so as to prohibit the layer from charging with static electricity and further improves smoothness of the surface of the magnetic layer arranged thereon. Examples of carbon blacks for incorporation into the non-magnetic layer are those described before for the magnetic layer. The particle size of carbon black for the non-magnetic layer is preferably not more than 35 mμ, and more preferably in the range of 10 to 35 mμ. The carbon black can be incorporated into the non-magnetic layer in an amount of 3 to 20 weight parts, preferably 4 to 18 weight parts, and more preferably 5 to 15 weight parts, based on 100 weight parts of the non-magnetic powder.

The non-magnetic layer may further contain a lubricant such as a fatty acid or a fatty acid ester. Examples of the lubricants employable for the non-magnetic layer are those described before for the magnetic recording layer. The lubricant can be employed in an amount of 0.2 to 20 weight parts based on 100 weight parts of the non-magnetic powder in the non-magnetic layer.

The binder described before for the magnetic recording layer can be also employed for the preparation of the non-magnetic layer. The non-magnetic layer comprises the binder in an amount of 5 to 50 weight parts, and preferably 10 to 30 weight parts, based on 100 weight parts of the non-magnetic powder in the non-magnetic layer. In the case where the non-magnetic layer contains, as the binder, a combination of one or more of the above vinyl chloride resins, polyurethane resin and polyisocyanate, the amounts preferably are in the ranges of 5 to 70 wt. %, 2 to 50 wt. % and 2 to 50 wt. %, respectively. The non-magnetic layer may further contain the optional components described before.

Next, the back-coating layer is described in more detail.

The back-coating layer mainly comprises a binder and carbon black, and preferably the carbon black comprises a combination of two kinds of carbon blacks having different mean particle size. One carbon black comprises of relatively small particles having a mean particle size of 10 to 30 mμ (carbon black I), and the other comprises relatively large particles having a mean particle size of 150 to 300 mμ (carbon black II). The carbon black I having such a relatively small particle size imparts to the back-coating layer a low surface electric resistance. Moreover, the carbon black I can reduce a friction coefficient effectively when it is employed in combination with a liquid lubricant, because the carbon black I can well keep the liquid lubricant on its surface. The carbon black II having a relatively large particles size can serve as a solid lubricant and further forms protrusions of small sizes on the surface of the back-coating layer. Such small size protrusions can reduce the total area of contact between the back-coating layer and the support members (for instance, guide poles) of the recording device. The reduced contact area results in reducing the friction coefficient between the back-coating layer and the supporting members of the reproduction devices.

The ratio of carbon black I to carbon black II preferably is 2/98 to 20/80 (by weight), and more preferably 4/96 to 15/85. The total amount of carbon black(s) generally is in the range of 500 to 1500 weight parts, and preferably 800 to 1200 weight parts, based on 100 weight parts of the binder of the back-coating layer. As the binder of the back-coating layer, known resins are employable. Preferably, a combination of nitrocellulose resin and polyester polyurethane resin is employed.

In order to reinforce the back-coating layer and to enhance the running durability of the tape, the back-coating layer may contain an inorganic material powder having Mohs' scale of hardness of 5 to 9. The back-coating layer containing the inorganic powder together with the carbon black is hardly frayed even when the recording tape is repeatedly used. Further, the inorganic material powder having Mohs' scale of hardness of 5 to 9 reduces wastes attaching to the supporting members (e.g., guide pole) with which the magnetic recording tape runs in contact, because the powder serves as a moderate abrasive. The inorganic material powder preferably has a mean particle size of 0.01 to 1 μm, more preferably 0.05 to 0.5 μm, and most preferably 0.08 to 0.3 μm. Examples of the inorganic material powders include powders of α-iron oxide, α-alumina and chromium oxide ($Cr_2O_3$). These powders may be used singly or in combination. Preferred are powders of α-iron oxide and α-alumina. The amount of the inorganic material powder preferably is in the range of 0.01 to 5 weight parts, and more preferably 0.05 to 2 weight parts, based on 100 weight parts of the carbon black.

The dispersing agents described for the magnetic recording layer are also employable for preparing the back-coating layer. Preferably, copper oleate, copper phthalocyanine, or barium sulfate are employed in combination. The dispersing agent is added in an amount of 0.5 to 20 weight parts, based on 100 weight parts of the binder.

The following is a brief description of an appropriate process for preparing the magnetic recording tape of the invention.

In a conventional manner, the magnetic recording tape of the invention can be produced by the steps of forming a non-magnetic layer and a magnetic recording layer in order on one surface side of the support, and then forming the back-coating layer on the other surface side.

Preferably, the magnetic recording layer is prepared by the so-called "wet-on-wet process", in which the magnetic recording layer is formed on the non-magnetic layer while the non-magnetic layer is still wet. The wet-on-wet process is performed, for example, by coating the coating dispersion for preparing the magnetic recording layer on the non-magnetic layer which is still wet.

A variety of procedures for conducting the wet-on-wet process are described in the following U.S. and Japanese patent publications:

1) U.S. Pat. Nos. 4,681,062, 4,480,583 and 5,302,206 for gravure coating, roller coating, blade coating, and extrusion coating;

2) U.S. Pat. Nos. 4,854,262, 5,030,484 and 5,302,206 for simultaneous coating by means of a coating device comprising two slits in a single coating head; and 3) Japanese Patent Provisional Publication No. 2(1990)-174965 for simultaneous coating using an extrusion coating device equipped with a back-up roller.

For preparation of the magnetic recording tape of the invention, the non-magnetic layer and the magnetic recording layer are preferably formed by simultaneous coating.

The magnetic layer thus formed preferably has a surface roughness (Ra) of 1 to 5 nm, more preferably 2 to 2.8 nm, and most preferably 2.2 to 2.7 nm, which is determined by 3D-MIRAU (three-dimensional) method.

The surface state of the back-coating layer is often transferred onto the magnetic recording layer while the recording tape is stored in the form of a roll, and hence the back-coating layer preferably has a smooth surface. Preferably, the back-coating layer has a surface roughness (Ra) of 0.0030 to 0.060 μm (namely 3 to 60 mm, average roughness at the center of cut-off 0.08 mm). In the calender surface treatment performed after applying the coating solution, the surface roughness can be adjusted by selecting the conditions of the calender roll (e.g., material, surface state, and pressure).

The thicknesses of the non-magnetic layer, the magnetic recording layer and the back-coating layer preferably are in the ranges of 0.2 to 3.0 μm, and more preferably 1.0 to 2.5 μm, 0.01 to 1.0 μm, more preferably 0.05 to 0.8 μm, most preferably 0.08 to 0.5 μm, and particularly preferably 0.1 to 0.3 μm, and 0.2 to 0.8 μm, respectively. The total thickness of the resulting magnetic recording tape preferably is in the range of 5 to 10 μm, more preferably 7 to 9.5 μm, and most preferably 7.5 to 9.5 μm. The width of the magnetic recording tape depends on the system, but a width of 5 to 13 mm, more preferably 7 to 13 mm, and most preferably 10 to 13 μm is generally suitable for recording computer data.

As described before, the magnetic recording tape of the invention is designed so that the lateral dimension may hardly varies with heat or moisture, and hence is advantageously used in a magnetic recording-reproducing system employing an MR head in the linear recording method. In particular, the magnetic recording tape of the invention is suitable for the system in which the magnetic head is controlled in accordance with the servo signals to place the head at a proper position of the track. Therefore, the servo signals are preferably recorded on the tape in the longitudinal direction, and thereby the tracking accuracy can be remarkably improved.

There is no restriction on the MR head, and known MR heads are employable. Particularly preferred is an MR head comprising an MR device (for example, comprising Fe/Ni permalloy film) of shield type or upright type with which the magnetic recording tape runs in contact.

The present invention is further described by the following examples and comparison examples. In these examples, "part(s)" means "part(s) by weight".

Example 1

[Coating Dispersions for Preparing Non-magnetic and Magnetic Layers]

(Components for the non-magnetic layer)

| | |
|---|---|
| Non-magnetic powder (titanium dioxide) (rutile type, $TiO_2$ content: higher than 90%, mean primary particle size: 0.035 μm, specific surface area (BET): 40 m$^2$/g, pH: 7.0 DBP (dibutyl phthalate) absorption: 27–38 g/100 g, Mohs' scale of hardness: 6.0 having surface covered with 1.5 wt. % of $Al_2O_3$) | 90 parts |
| Carbon black (available from Mitsubishi Carbon Co., Ltd., mean primary particle size: 16 mμ, DBP absorption: 80 mL/100 g, pH: 8.0, specific surface area (BET): 250 m$^2$/g, volatile content: 1.5%) | 10 parts |
| Vinyl chloride copolymer having the polar groups (-SO$_3$K, epoxy group) (MR-110, available from Nippon Zeon Co., Ltd.) | 12 parts |
| Polyester-polyurethane resin having s polar group (—SO$_3$Na) (neopentyl glycol/caprolactone polyol/diphenylmethane-4,4'-diisocyanate (MDI) = 0.9/2.6/1, weight ratio, content of —SO$_3$Na group: 1 × 10$^{-4}$ mol/g) | 5 parts |
| Polyisocnanate (Colonate L, available from Nippon Polyurethane Industries, Ltd.) | 3 parts |
| Buthyl stearate | 1 part |
| Stearic acid | 2 parts |
| Methyl ethyl ketone | 150 parts |
| Cyclohexancne | 50 parts |

(Components for the magnetic layer)

| | |
|---|---|
| Ferromagnetic metal powder (Fe:Co = 90:10 (atomic ratio), coercive force (Hc): 1850 Oe, specific surface area (BET): 58 m$^2$/g, crystallite size: 175 angstroms, saturation magnetization (σs): 130 emu/g, grain size (mean diameter along the major axis): 0.09 μm, aspect ratio: 7.0, pH: 8.6, water soluble Na: 70 ppm, water soluble Ca: 10 ppm, water soluble Fe: 10 ppm) | 100 parts |

-continued

| [Coating Dispersions for Preparing Non-magnetic and Magnetic Layers] | |
|---|---|
| Vinyl chloride copolymer having a polar groups (—SO$_3$K) (MR-110, avaliable from Nippon Zeon Co., Ltd., polymerization degree: 350, content of —SO$_3$K group: 5 × 10$^{-6}$ mol/g, content of epoxy group: 3.5 wt. % in terms of monomer unit) | 12 parts |
| Polyester-polyurethane resin having a polar group (—SO$_3$Na) (neopentyl glycol/caprolactone polyol/MDI = 0.9/2.6/1, weight ratio, content of —SO$_3$Na group: 1 × 10$^{-4}$ mol/g) | 3 parts |
| Polyisocyanate (Colonate L, available from Nippon Polyurethane Industries, Ltd.) | 3 parts |
| α-Alumina (particle size: 0.2 μm) | 5 parts |
| Carbon black (particle size: 0.08 μm) | 0.5 part |
| Butyl stearate | 1 part |
| Stearic acid | 2 parts |
| Methyl ethyl ketone | 150 parts |
| Cyclohexanone | 50 parts |

All ingredients except the polyisocyanate of each layer were kneaded in a continuous kneader and dispersed in a sand mill. Each resulting dispersion was mixed with 3 parts of the polyisocyanate (Colonate L) and 40 parts of butyl acetate. The mixture was passed through a filter having a mean pore size of 1 μm, to give a coating dispersion for preparing each of the non-magnetic layer and the magnetic recording layer.

| [Coating Dispersions for Preparing Back-Coating Layer] | | |
|---|---|---|
| (Components for the back-coating layer) | | |
| Carbon black I (primary mean particle size: 17 mμ DBP absorption: 75 mL/100 g, pH: 8.0, specific surface area (BET): 220 m$^2$/g, volatile content: 1.5% bulk density: 15 1bs/ft$^3$) | | 100 parts |
| Nitrocellulose | | 100 parts |
| Polyurethane resin (NIPPORAN [trade name], available from Nippon Polyurethane Industries Co., Ltd.) | | 30 parts |
| Dispersant: | copper oleate | 10 parts |
| | copper phthalocyanine | 10 parts |
| | barium sulfate | 5 parts |
| Methyl ethyl ketone | | 500 parts |
| Toluene | | 500 parts |

The above-mentioned ingredients were preliminarily kneaded, and then further kneaded in a roll mill. To 100 parts of the obtained mixture, the following ingredients were added and dispersed in a sand grinder.

| Carbon black II (primary mean particle size: 200 mμ, DBP absorption: 36 mL/100 g, pH: 8.5, specific surface area (BET): 200 m$^2$/g) | 100 parts |
|---|---|
| α-alumina (mean particle size: 0.2 μm) | 0.1 part |

The prepared dispersion was filtered, and 120 parts of methyl ethyl ketone and 5 parts of polyisocyanate (Colonate L) were added to 100 parts of the dispersion. Thus, a coating dispersion for preparing the back-coating layer was prepared.

[Preparation of Magnetic recording tape for Recording Computer Data]

The above-prepared coating dispersion for magnetic recording layer and the coating dispersion for non-magnetic layer were coated on a polyethylene naphthalate (PEN) support web (thickness: 6.0 μm, central surface roughness: 0.005 μm, longitudinal Young's modulus: 800 kg/mm$^2$, lateral Young's modulus: 650 kg/mm$^2$) by a simultaneous double coating method, to give a non-magnetic layer and a magnetic recording layer having thicknesses of 2.1 μm and 0.20 μm, respectively (in terms of thickness after dryness).

The coated layers were treated successively with a cobalt magnet having a magnetic flux density of 3,000 gauss and a solenoid having a magnetic flux density of 1,500 gauss for orientation while the layers were still wet. Thus treated layers were dried to give a non-magnetic layer and a magnetic recording layer placed thereon.

The coating dispersion for the back-coating layer were then coated on the surface of the support web opposite to the surface on which the non-magnetic layer and the magnetic recording layer were provided, to give a back-coating layer having a thickness of 0.5 μm (in terms of thickness after dryness). Thus, a continuous magnetic recording web was produced in the form of a roll.

The continuous magnetic recording web was then subjected to calendaring (temperature: 90° C., linear pressure 300 kg/cm$^2$) by passing the web between six nips each of which comprises a pair of metal rollers. The calendared recording web was slit to give a magnetic recording tape having a width of ½ inch.

The magnetic recording tape was then encased in a ½ inch IBM 3480 tape cartridge (tape length: 580 m).

Comparison Example 1

The procedures of Example 1 were repeated except for using a different polyethylene naphthalate (PEN) support web (longitudinal Young's modulus: 900 kg/mm$^2$, lateral Young's modulus: 550 kg/mm$^2$), to produce a magnetic recording tape for comparison. The magnetic recording tape was then encased in a ½ inch IBM 3480 tape cartridge (tape length: 580 m).

Comparison Example 2

The procedures of Example 1 were repeated except for using a different polyethylene naphthalate (PEN) support web (longitudinal Young's modulus: 700 kg/mm$^2$, lateral Young's modulus: 760 kg/mm$^2$), to produce a magnetic recording tape for comparison. The magnetic recording tape was then encased in a ½ inch IBM 3480 tape cartridge (tape length: 580 m).

Comparison Example 3

The procedures of Example 1 were repeated except for using a polyethylene terephthalate (PET) support web (thickness: 6.0 μm, central surface roughness: 0.005 μm, longitudinal Young's modulus: 760 kg/mm$^2$, lateral Young's modulus: 400 kg/mm$^2$) in place of the PEN support web, to produce a magnetic recording tape for comparison. The magnetic recording tape was then encased in a ½ inch IBM 3480 tape cartridge (tape length: 580 m).

Magnetic Recording-Reproducing System (1) Thin-Film Magnetic Heads a) Recording Head structure: inductive head comprising 2-turn thin-film coil provided between amorphous Co magnetic thin-film yokes, track width: 66 μm, gap length: 1.4 μm.

b) Reproducing Head structure: shunt bias magnetoresistive reproducing head having double shields, track width: 22 μm, shield interval: 0.45 μm.

(2) Composition of the System

The above heads were incorporated in a recording-reproducing apparatus (F613A drive [trade name], available from Fujitsu, Ltd.) which is ½ inch IBM 3480 tape drive, to compose a recording-reproducing system (tape speed: 40 inches/second).

Evaluation of Magnetic Recording Tape (1) The thermal and humidity expansion coefficients, the offset proof stress, the breaking strength and the total thickness of each magnetic recording tape prepared above were measured in the following manners.

a) Thermal and humidity expansion coefficients

The magnetic recording tape was cut to prepare a sample piece (lateral length: 30 mm, longitudinal length: 5 mm). The sample was set on a Thermomechanical Analyzer (TMA), and aged in a desiccator for 24 hours. After aging was complete, the dimensional variation between at 20° C. and 30° C. was measured to calculate the thermal expansion coefficient in accordance with the formula of:

thermal expansion coefficient=(dimensional variation/sample length)/temperature variation.

In the same manner, the dimensional variation between at 30%RH and 80%RH was measured to determine the humidity expansion coefficient in accordance with the formula of:

humidity expansion coefficient=(dimensional variation/sample length)/humidity variation.

b) Offset proof stress and breaking strength

The tape was cut to prepare a sample-tape (length: 200 mm), and the mechanical strength of the sample was measured by means of a commercially available Tensilon (tension-measuring device, stretching rate: 100 mm/min.).

c) Total thickness 10 magnetic recording tapes were superposed, and the thickness of the superposed composition was measured with a micrometer (available from Mitsutoyo co., Ltd.) to estimate the total thickness of each tape. The obtained thickness was 8.8 μm.

(2) Each prepared magnetic recording tape was evaluated in the following manners (A) to (C).

(A) The tape was set in each following magnetic recording-reproducing system, and the reproduction output was measured under the below-described conditions to estimate the reliability of the tape.

(A-1) In the system using no servo control, reference data was recorded on the magnetic recording tape under the following conditions:

temperature: 5° C., track width: 80 μm, recording wavelength: 0.8 μm.

humidity: 10%RH, number of tracks: 128,

The recorded data was reproduced by means of a reproducing head of 50 μm width under the same conditions as above, and independently the recorded data was again reproduced under the conditions of 55° C., 70%RH. From the comparison between the outputs reproduced under the different conditions, the reliability against environmental variation was evaluated.

(A-2) In the system using servo control with three servo bands, reference data was recorded on the tape under the following conditions:

temperature: 5° C., track width: 80 μm, recording wavelength: 0.5 μm.

humidity: 10%RH, number of tracks: 128, The recorded data was reproduced by means of a reproducing head of 50 μm width under the same conditions as above, and independently the recorded data was again reproduced under the conditions of 55° C., 70%RH. From the comparison between the outputs reproduced under the above different conditions, the reliability against environmental variation was evaluated.

In each of the above (A-1) and (A-2), the output ratio was calculated in accordance with the formula of:

output ratio (%)=[(output at 55° C., 70%RH)/(output at 5° C., 10%RH)]x 100.

(B) The magnetic recording tape was set in the above system (using no servo control), and caused to repeatedly run 5,000 times from BOT (beginning of the tape) to EOT (end of the tape) while the reproduction output was measured to evaluate the running characteristics.

(C) The tape was set in the above system (using servo control), and caused to repeatedly run 50,000 times from the BOT (beginning of the tape) to the EOT (end of the tape). If running error occurred during the runs, the tape was stopped and the number of runs was recorded.

In the above measurements, the tension given to the running tape (except BOT and EOT at the moment to stop or start) was kept at 1.0 N.

The results are set forth in Table 1.

TABLE 1

| Example 1 | |
|---|---|
| thermal expansion coefficient (%/° C.): | 0.0006 |
| humidity expansion coefficient (%/% RH): | 0.0012 |
| offset proof stress (N): | 11 |
| breaking strength (N): | 31 |
| Evaluation | |
| output ratio (%) | |
| non-servo controlled: 94 | servo controlled: 99 |
| running characteristics | |
| output depression: 0% | |
| running error: not occurred | |
| Comparison Example 1 | |
| thermal expansion coefficient (%/° C.): | 0.00175 |
| humidity expansion coefficient (%/% RH): | 0.0016 |
| offset proof stress (N): | 11.7 |
| breaking strength (N): | 35 |

TABLE 1-continued

Evaluation output ratio (%)

| | |
|---|---|
| non-servo controlled: 74 | servo controlled: 82 | running characteristics output depression: 0%
running error: not occurred
Comparison Example 2

| | |
|---|---|
| thermal expansion coefficient (%/° C.): | 0.0003 |
| humidity expansion coefficient (%/% RH): | 0.0010 |
| offset proof stress (N): | 8.7 |
| breaking strength (N): | 27 |

Evaluation output ratio (%)

| | |
|---|---|
| non-servo controlled: 99 | servo controlled: 100 | running characteristics output depression: 40%
running error: occurred after 13000 runs
Comparison Example 3

| | |
|---|---|
| thermal expansion coefficient (%/° C.): | 0.002 |
| humidity expansion coefficient (%/% RH): | 0.0015 |
| offset proof stress (N): | 7.7 |
| breaking strength (N): | 33 |

Evaluation output ratio (%)

| | |
|---|---|
| non-servo controlled: 72 | servo controlled: 80 | running characteristics output depression: 45%
running error: occurred after 9000 runs The results set forth in Table 1 indicate the following facts.

The magnetic recording tape according to the invention (Example 1) showed small output variation (the output ratio was more than 90%) whether the tracking control based on the servo signals was conducted or not. Further, no output depression was observed even after 5,000 runs, and no running error occurred during 50,000 runs. This means that the magnetic recording tape hardly varies in the lateral dimension in the width direction with heat or moisture. Therefore, it was confirmed that the magnetic recording tape of the invention has excellent characteristics in both tracking and running, and hence the magnetic recording tape is favorably used in a magnetic recording-reproducing system equipped with an MR head.

The magnetic recording tape of Comparison Example 1 (in which the longitudinal offset proof stress and the longitudinal breaking strength are in the ranges of the invention, but the lateral thermal and humidity expansion coefficients are out of the above ranges) varied much in the lateral dimension with heat or moisture, and accordingly the output considerably varied. This means that the magnetic recording tape is by no means advantageously employable in the magnetic recording-reproducing system with an MR head.

The magnetic recording tape of Comparison Example 2 (in which the thermal and humidity expansion coefficients are in the ranges of the invention, but the offset proof stress and the breaking strength are out of the above ranges) showed poor running characteristics, and consequently the output depression occurred after 5,000 runs. Further, during the repeated runs, the tracking went out of control.

The magnetic recording tape of Comparison Example 3 (in which the humidity expansion coefficient and the breaking strength are in the ranges of the invention, but the thermal expansion coefficient and the offset proof stress are out of the above ranges) varied much in the lateral dimension with heat or moisture, and showed poor running characteristics. This means that the magnetic recording tape is by no means advantageously employable in the system with an MR head.

The reason why the running characteristics of magnetic recording tapes of Comparison Examples 2 and 3 considerably deteriorated is presumed that tension higher than the offset proof stress was given to the BOT and the EOT at the moment to stop, and consequently that the tension irreversibly deformed the tape.

Example 2

The procedures of Example 1 were repeated except for using a longitudinally stretched polyethylene naphthalate (PEN) support web (thickness: 6.0 $\mu$m, central surface roughness: 0.005 $\mu$m), to produce a magnetic recording tape of the invention. The magnetic recording tape was then encased in a ½ inch IBM 3480 tape cartridge (tape length: 580 m).

Comparison Example 4

The procedures of Example 2 were repeated except for using a different polyethylene naphthalate (PEN) support web which had been longitudinally stretched more than the support web of Example 2 (thickness: 6.0 $\mu$m, central surface roughness: 0.005 $\mu$m), to produce a magnetic recording tape for comparison. The magnetic recording tape was then encased in a ½ inch IBM 3480 tape cartridge (tape length: 580 m).

Comparison Example 5

The procedures of Example 2 were repeated except for using a both longitudinally and laterally stretched polyethylene naphthalate (PEN) support web (thickness: 6.0 $\mu$m, central surface roughness: 0.005 $\mu$m), to produce a magnetic recording tape for comparison. The magnetic recording tape was then encased in a ½ inch IBM 3480 tape cartridge (tape length: 580 m).

Comparison Example 6

The procedures of Example 2 were repeated except for using a polyethylene terephthalate (PET) support web which had been longitudinally stretched more than the PEN support web of Example 2 (thickness: 6.0 $\mu$m, central surface roughness: 0.005 $\mu$m), to produce a magnetic recording tape for comparison. The magnetic recording tape was then encased in a ½ inch IBM 3480 tape cartridge (tape length: 580 m).

Evaluation of Magnetic recording tape (1) The thermal and humidity expansion coefficients, the offset proof stress, the breaking strength and the total thickness of each tape prepared above were measured in the manners described above. Thus obtained total thickness of each magnetic recording tape was 8.8 $\mu$m. Further, the Young's modulus of the tape was measured in the following manner.

d) Young's modulus

The magnetic recording tape was cut to prepare a sample piece (length: 200 mm), and the mechanical strength of the sample piece was measured by means of a commercially available Tensilon (tension-measuring device, stretching rate: 100 mm/minute). The results are set forth in Table 2.

TABLE 2

| | Young's modulus longitudinal / lateral |
|---|---|
| Example 2 | 1000 / 740 |
| Comparison Example 4 | 1100 / 630 |
| Comparison Example 5 | 900 / 850 |
| Comparison Example 6 | 650 / 300 |

(2) Each prepared tape was evaluated in the above manners (A) to (C). The results are set forth in Table 3.

TABLE 3

Example 2

| | |
|---|---|
| thermal expansion coefficient (%/° C.): | 0.0006 |
| humidity expansion coefficient (%/% RH): | 0.0012 |
| offset proof stress (N): | 11 |
| breaking strength (N): | 31 |

Evaluation output ratio (%)

| | |
|---|---|
| non-servo controlled: 94 | servo controlled: 99 | running characteristics output depression: 0%
running error: not occurred

Comparison Example 4

| | |
|---|---|
| thermal expansion coefficient (%/° C.): | 0.00175 |
| humidity expansion coefficient (%/% RH): | 0.0016 |
| offset proof stress (N): | 11.7 |
| breaking strength (N): | 35 |

Evaluation output ratio (%)

| | |
|---|---|
| non-servo controlled: 74 | servo controlled: 82 | running characteristics output depression: 0%
running error: not occurred

Comparison Example 5

| | |
|---|---|
| thermal expansion coefficient (%/° C.): | 0.0003 |
| humidity expansion coefficient (%/% RH): | 0.0010 |
| offset proof stress (N): | 8.7 |
| breaking strength (N): | 27 |

Evaluation output ratio (%)

| | |
|---|---|
| non-servo controlled: 99 | servo controlled: 100 | running characteristics output depression: 40%
running error: occurred after 13000 runs Comparison Example 6

| | |
|---|---|
| thermal expansion coefficient (%/° C.): | 0.002 |
| humidity expansion coefficient (%/% RH): | 0.0015 |
| offset proof stress (N): | 7.7 |
| breaking strength (N): | 33 |

Evaluation output ratio (%)

| | |
|---|---|
| non-servo controlled: 72 | servo controlled: 80 | running characteristics output depression: 45%
running error: occurred after 9000 runs The results set forth in Table 3 indicate the following facts.

Each of the magnetic recording tapes according to the invention (Example 2) and Example 1, has excellent characteristics in both tracking and running. On the other hand, each of the magnetic recording tapes of Comparison Examples 4 to 6 (in which at least one of the thermal and humidity expansion coefficients, the offset proof stress and the breaking strength is out of the range of the invention), as well as Comparison Examples 1 to 3 in Table 1, does not show satisfying characteristics in either tracking or running.

What is claimed is:

1. A magnetic recording tape comprising a support, and on one side of the support, a non-magnetic layer comprising a non-magnetic powder and a binder, and a magnetic recording layer comprising a ferromagnetic powder and a binder superposed in order, and on the other side, a back-coating layer containing carbon black, wherein said magnetic recording tape has a lateral thermal expansion coefficient of not more than 0.0015%/° C., a lateral humidity expansion coefficient of not more than 0.0015%/%RH, a longitudinal offset proof stress of not less than 10 N, and a longitudinal breaking strength of not less than 30 N, and wherein servo signals for controlling a magnetic recording or reproducing head are longitudinally recorded on said tape so as to position the head at a predetermined position along a width direction of the recording tape.

2. The magnetic recording tape of claim 1, wherein said magnetic recording tape has a width of 5 to 13 mm.

3. The magnetic recording tape of claim 1, wherein said magnetic recording tape has a total thickness of 5 to 10 μm.

4. The magnetic recording tape of claim 1, wherein the support has a lateral Young's modulus of not less than 600 kg/mm$^2$.

5. The magnetic recording tape of claim 4, wherein the support has a lateral Young's modulus in the range of 650 to 700 kg/mm$^2$.

6. The magnetic recording tape of claim 1, wherein the support has a longitudinal Young's modulus of not less than 750 kg/mm$^2$.

7. The magnetic recording tape of claim 6, wherein the support has a longitudinal Young's modulus in the range of 800 to 850 kg/mm$^2$.

8. The magnetic recording tape of claim 1, wherein the support is made of polyethylene naphthalate.

9. The magnetic recording tape of claim 1, which has a lateral Young's modulus of not less than 650 kg/mm$^2$.

10. The magnetic recording tape of claim 9, which has a lateral Young's modulus in the range of 730 to 800 kg/mm$^2$.

11. The magnetic recording tape of claim 10, which has a longitudinal Young's modulus in the range of 1,000 to 1,100 kg/mm$^2$.

12. The magnetic recording tape of claim 1, which has a longitudinal Young's modulus of not less than 950 kg/mm$^2$.

13. The magnetic recording tape of claim 1, which has a width of 5 to 13 mm.

14. The magnetic recording tape of claim 13, which has a width of 10 to 13 mm.

15. The magnetic recording tape of claim 1, which has a total thickness of 5 to 10 μm.

16. The magnetic recording tape of claim 15, which has a total thickness of 7.5 to 9.5 μm.

17. The magnetic recording tape of claim 1, wherein the carbon black comprises a combination of two kinds of carbon blacks having different mean particle sizes, one carbon black comprising relatively fine particles having a mean particle size of 10 to 30 mμ, and the other carbon black comprising relatively crude particles having a mean particle size of 150 to 300 mµ.

18. The magnetic recording tape of claim 1, wherin the back-coating layer further contains an inorganic material powder having Moh's scale of hardness of 5 to 9.

19. The magnetic recording tape of claim 18, wherein the inorganic material powder has a mean particle size of 0.08 to 1 µm.

20. The magnetic recording tape of claim 18, wherein the inorganic material powder is α-alumina.

21. The magnetic recording tape of claim 1, wherin the back-coating layer has a thickness of 0.2 to 0.8 µm.

22. In a magnetic recording and reproducing system comprising the steps of recording magnetic signals to a magnetic recording tape and detecting said magnetically recorded signals in said magnetic tape with a magnetoresistive reproducing head, the improvement characterized in that said magnetic recording tape comprises a support, and on one side of the support, a non-magnetic layer comprising a non-magnetic powder and a binder, and a magnetic recording layer comprising a ferromagnetic powder and a binder superposed in order, and on the other side, a back-coating layer containing carbon black, wherein said magnetic recording tape has a lateral thermal expansion coefficient of not more than 0.0015%/° C., a lateral humidity expansion coefficient of not more than 0.0015%/% RH, a longitudinal offset proof stress of not less than 10 N, and a longitudinal breaking strength of not less than 30 N.

23. The magnetic recording and reproducing system of claim 22, wherein said system comprises a multi-tracks linear recording.

* * * * *